United States Patent
Jain et al.

(10) Patent No.: US 12,200,656 B2
(45) Date of Patent: Jan. 14, 2025

(54) METHOD AND APPARATUS FOR CONTROLLING A REMOTE DEVICE IN AN INTERNET OF THINGS (IOT) ENVIRONMENT

(71) Applicant: SAMSUNG ELECTRONICS CO., LTD., Suwon-si (KR)

(72) Inventors: Ankit Jain, New Delhi (IN); Siba Prasad Samal, Bangalore (IN); Ravi Nanjundappa, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/074,073

(22) Filed: Dec. 2, 2022

(65) Prior Publication Data

US 2023/0100194 A1   Mar. 30, 2023

Related U.S. Application Data

(63) Continuation of application No. PCT/KR2022/014647, filed on Sep. 29, 2022.

(30) Foreign Application Priority Data

Sep. 30, 2021   (IN) ............................ 202141044967

(51) Int. Cl.
*H04W 64/00*   (2009.01)
*H04L 67/12*   (2022.01)

(52) U.S. Cl.
CPC ........... *H04W 64/003* (2013.01); *H04L 67/12* (2013.01)

(58) Field of Classification Search
CPC ..... H04W 64/003; H04M 11/00; H04L 67/12; H04L 67/125; H04L 67/306; H04L 67/52; H04L 67/535
See application file for complete search history.

(56) References Cited

U.S. PATENT DOCUMENTS

| | | |
|---|---|---|
| 9,985,715 B2 | 5/2018 | Cho et al. |
| 2011/0208359 A1 | 8/2011 | Duchene et al. |

(Continued)

FOREIGN PATENT DOCUMENTS

| | | |
|---|---|---|
| KR | 1020060080332 A | 7/2006 |
| KR | 10-1786928 B1 | 11/2017 |

(Continued)

OTHER PUBLICATIONS

Henry, A. "How to Remap the Hardware Buttons on Your Android Phone". https://lifehacker.com/how-to-remap-the-hardware-buttons-on-your-android-phone-1443192245. (Year: 2013).*

(Continued)

Primary Examiner — John M MacIlwinen
(74) Attorney, Agent, or Firm — Sughrue Mion, PLLC

(57) ABSTRACT

A method for controlling a remote device in an Internet of Things (IoT) environment is provided. The method includes: identifying a primary IoT device in a first location; identifying at least one secondary IoT device in a second location; determining that a user is currently in the second location; determining an intent of the user to control the primary IoT device from the second location; and reconfiguring at least one default functionality of a secondary IoT device, among the at least one secondary IoT device, such that the secondary IoT device is operable by the user as a user interface to control the primary IoT device from the secondary location.

20 Claims, 8 Drawing Sheets

(56) References Cited

U.S. PATENT DOCUMENTS

| | | | |
|---|---|---|---|
| 2014/0244001 A1 | 8/2014 | Glickfield et al. | |
| 2019/0295542 A1 | 9/2019 | Huang et al. | |
| 2019/0310824 A1 | 10/2019 | Sung et al. | |
| 2019/0361575 A1 | 11/2019 | Ni et al. | |
| 2020/0005145 A1* | 1/2020 | Kim | G05B 13/0265 |
| 2020/0192630 A1* | 6/2020 | Schairer | G10L 15/22 |
| 2020/0257494 A1 | 8/2020 | Babushkin | |
| 2020/0286368 A1 | 9/2020 | Trupp | |
| 2020/0342861 A1 | 10/2020 | Ni et al. | |
| 2022/0217186 A1* | 7/2022 | Hannu | H04N 21/2343 |

FOREIGN PATENT DOCUMENTS

| | | |
|---|---|---|
| WO | 2007/023414 A2 | 3/2007 |
| WO | 2016111916 A1 | 7/2016 |

OTHER PUBLICATIONS

Ding, Wenbo, and Hongxin Hu. "On the safety of iot device physical interaction control." Proceedings of the 2018 ACM SIGSAC Conference on Computer and Communications Security. (Year: 2018).*

Logitech, "Harmony Smart Control User Guide," 2013, Total 43 pages, retrieved from https://www.logitech.com/en-us/products/harmony/harmony-elite.915-000256.html.

C4ETech English, "Customization Tip—Remap Volume & Other Keys (NO Root)," Apr. 13, 2019, YouTube: https://www.youtube.com/watch?v=rW7LkORcsC8.

Alan HENRY, "How to Remap the Hardware Buttons on Your Android Phone," Oct. 10, 2013, Total 7 pages, retrieved from https://lifehacker.com/how-to-remap-the-hardware-buttons-on-your-android-phone-1443192245.

Joe Hindy, "5 best hardware remap apps to keep your buttons working," May 1, 2022, Total 8 pages, retrieved from https://www.androidauthority.com/best-hardware-remap-apps-android-978645/.

Nitish Matta, "How to Customize, Remap and Reprogram Unused Buttons on your Android TV Remote?" Nov. 28, 2019, Total 8 pages, retrieved from https://mrnoob.net/customize-unused-buttons-on-android-tv-remote/.

Gaurav Bidasaria, "4 Ways to Remap Power or Any Hardware Buttons on Android Smartphones," Jan. 1, 2019, Total 9 pages, retrieved from https://techwiser.com/remap-any-hardware-buttons-on-android/.

LG, "Ranges & Ovens," Web page <https://www.lg.com/us/ranges-ovens>, 2022, Total 5 pages.

Tovala, "Experience genius," Web page <https://www.tovala.com/oven>, 2022, Total 8 pages.

Tovala, "Tovala Smart Oven, Countertop Toaster Oven—Toast, Steam, Bake, Broil, and Reheat—Smartphone Controlled Convention Oven," Web page <https://www.amazon.com/dp/B07K85LXBK?ref=ods_ucc_bllcomp_B07K85LXBK_nrc_ucc>, retrieved Dec. 6, 2022, Total 8 pages.

Delta, "Delta voiceIQ Technology pairs with Amazon Alexa and Google Assistant," Web page <https://www.amazon.com/stores/node/2588266011?_encoding=UTF8&field-lbr_brands_browse-bin=DELTA%20FAUCET&ref_=w_bl_hsx_s_hi_web_2588266011&tag=mashable-editpost-20>, retrieved Dec. 6, 2022, Total 11 pages.

Stacy Higginbotham, "Delta's Alexa-enabled faucet is surprisingly useful," Jul. 11, 2018, Total 11 pages, retrieved from https://staceyoniot.com/deltas-alexa-enabled-faucet-is-surprisingly-useful/.

Bosch, "Bosch ovens (Home Connect)," Web page <https://developer.bosch-iot-suite.com/iot-devices/bosch-ovens/>, 2022, Total 2 pages.

Prodigio, "Connected espresso machine," Web page <http://iotlineup.com/device/prodigio>, retrieved Dec. 7, 2022, Total 2 pages.

Mr. Coffee, "Smart Coffeemaker," Web page <http://iotlineup.com/device/mr_coffee>, retrieved Dec. 7, 2022, Total 2 pages.

Zebra Blinds, "Can I Operate My Blinds Through IoT?" May 2020, Total 4 pages, retrieved from https://www.zebrablinds.com/blog/can-i-operate-my-blinds-through-iot-05-2020-22.

MySmartBlinds, "Blinds Automation Kit, transform Ordinary Blinds into Smart automated Window Blinds. iOS & Android Compatible," Web page <https://www.amazon.com/MySmartBlinds-Automation-automated-Compatible-Assistant/dp/B078T1X2HM>, retrieved Dec. 5, 2022, Total 4 pages.

Blossom, "Smart watering controller," Web page <http://iotlineup.com/device/blossom>, retrieved Dec. 7, 2022, Total 2 pages.

Bosch, "Bosch dishwashers (Home Connect)," Web page <https://developer.bosch-iot-suite.com/iot-devices/bosch-dishwashers/>, 2022, Total 2 pages.

Samsung, POWERbot Robot Vaccum (SR20H9051 Series), Web page <https://www.samsung.com/us/home-appliances/vacuums/powerbot-robot/powerbot-robot-vacuum-sr20h9051-series-vr2ah9051uw-aa/>, retrieved Dec. 5, 2022, Total 4 pages.

Samsung, "Samsung 1.5 Ton 5 Star Wi-Fi Inverter Split AC," Web page <https://www.amazon.in/Samsung-Wi-Fi-Inverter-Copper-AR18TY5AAWK/dp/B08568DJNH>, retrieved Dec. 7, 2022, Total 5 pages.

"Samsung's New Wi-Fi Range Brings New Era of Connectivity and Convenience to the Kitchen," May 5, 2016, Total 3 pages, retrieved from https://news.samsung.com/us/samsungs-new-wi-fi-range-brings-new-era-connectivity-convenience-kitchen/.

Racold, "Racold Omnis Wi-Fi 25 Litres Vertical 5 Star Storage Water Heater (Geyser)," Web page <https://www.amazon.in/Racold-Omnis-Wi-Fi-Storage-Heater/dp/B07VCG9HHQ>, retrieved Dec. 7, 2022, Total 5 pages.

Jacuzzi, "SmartTub System," Web page <https://www.jacuzzi.com/en-us/more-products/smarttub-system>, 2022, Total 4 pages.

Sonos, "Sonos One (Gen 2) Two Room Set Voice Controlled Smart Speaker with Amazon Alexa Built in," Web page <https://www.amazon.com/Sonos-One-Gen-Controlled-Built/dp/B07PCM1GZ9/?ots=1&tag=w050b-20&th=1>, retrieved Dec. 7, 2022, Total 6 pages.

Bose, "Bose SoundTouch 20 wireless speaker, works with Alexa," Web page <https://www.amazon.com/Bose-SoundTouch-wireless-speaker-738063-1100/dp/B011IH6E26/ref=as_li_ss_tl?ie=UTF8&linkCode=sl1&tag=techuplife-20&linkId=fbd3955fa6f3d472ef38d97af48939e6&language=en_US>, retrieved Dec. 7, 2022, Total 6 pages.

Samsung, "Samsung HW-Q70T 3.1.2ch Soundbar with Dolby Atmos / DTS:X (2020)," Web page <https://www.amazon.com/SAMSUNG-HW-Q60T-Soundbar-Surround-Acoustic/dp/B085WTR9FC/ref=as_li_ss_tl?dchild=1&keywords=q+series+soundbar&qid=1606171195&sr=8-3&th=1&linkCode=sl1&tag=techuplife-20&linkId=9312502ac903193c1ab81104841e0321&language=en_US>, retrieved Dec. 5, 2022, Total 5 pages.

US Appliance, "Samsung 30" Gas Cooktop with 5 Sealed Burners and Blue LED Illuminated Knobs," Web page <https://www.us-appliance.com/na30n6555ts.html>, 2020, Total 3 pages.

Nyimbo Mpya, "Tovala The First Smart Oven," Nov. 13, 2018, YouTube: https://www.youtube.com/watch?v=gWsMteLk9G4.

Signetik, "Connecting Technology with Agriculture," Web page <https://www.signetik.com/dfu>, 2022, Total 7 pages.

"Tutorial: Device Update for Azure IoT Hub using the Raspberry Pi 3 B+ reference image," Feb. 2021, Total 15 page, retrieved from https://docs.microsoft.com/en-us/azure/iot-hub/tutorial-firmware-update.

"IoT Lens: AWS Well-Architected Framework," Dec. 2019, Total 51 pages, retrieved from https://docs.aws.amazon.com/wellarchitected/latest/iot-lens/firmware-updates.html.

K. Zandberg et al., "Secure Firmware Updates for Constrained IoT Devices using Open Standards: A Reality Check," IEEE Access, 2016, Total 15 pages.

"Azure MXChip IoT DevKit Firmware OTA (Over-the-Air)," Nov. 27, 2019, Total 22 pages, retrieved from https://docs.microsoft.com/en-us/samples/azure-samples/mxchip-iot-devkit-firmware-ota/sample/.

Sam Desatoff, "Nintendo introduces button remapping in latest Switch firmware update," Apr. 15, 2020, Total 5 pages, retrieved from https://gamedaily.biz/article/1698/nintendo-introduces-button-remapping-in-latest-switch-firmware-update.

(56) References Cited

OTHER PUBLICATIONS

Brendan Sinclair, "Switch firmware update adds controls remapping," Apr. 14, 2020, Total 3 pages, retrieved from https://www.gamesindustry.biz/articles/2020-04-14-switch-firmware-update-adds-controls-remapping.

"Button Mapper: Remap your keys," Sep. 2018, Total 3 pages, retrieved from https://play.google.com/store/apps/details?id=flar2.homebutton&hl=en_IN&gl=US (updated on Jan. 6, 2022).

Martin Sweeney, "XDA Spotlight: Button Mapper, an App to Remap your Phone's Hardware Buttons," Jan. 21, 2017, Total 11 pages, retrieved from https://www.xda-developers.com/xda-spotlight-button-mapper-an-app-to-remap-your-phones-hardware-buttons/.

"How to control your device using switches in Android Pie," Jun. 26, 2019, Total 27 pages, retrieved from https://mcmw.abilitynet.org.uk/controlling-your-device-using-switches-android-pie.

Havells, "Havells Linea Electric Hot Water Tap 3300 Watts," Web page <https://www.amazon.in/Havells-Linea-Electric-Water-Silver/dp/B08JZ577LF>, retrieved Dec. 7, 2022, Total 3 pages.

International Search Report (PCT/ISA/210) and Written Opinion (PCT/ISA/237) dated Jan. 12, 2023 issued by the International Searching Authority in International Application No. PCT/KR2022/014647.

Communication issued Jul. 4, 2024 by the European Patent Office in European Patent Application No. 22876892.5.

\* cited by examiner

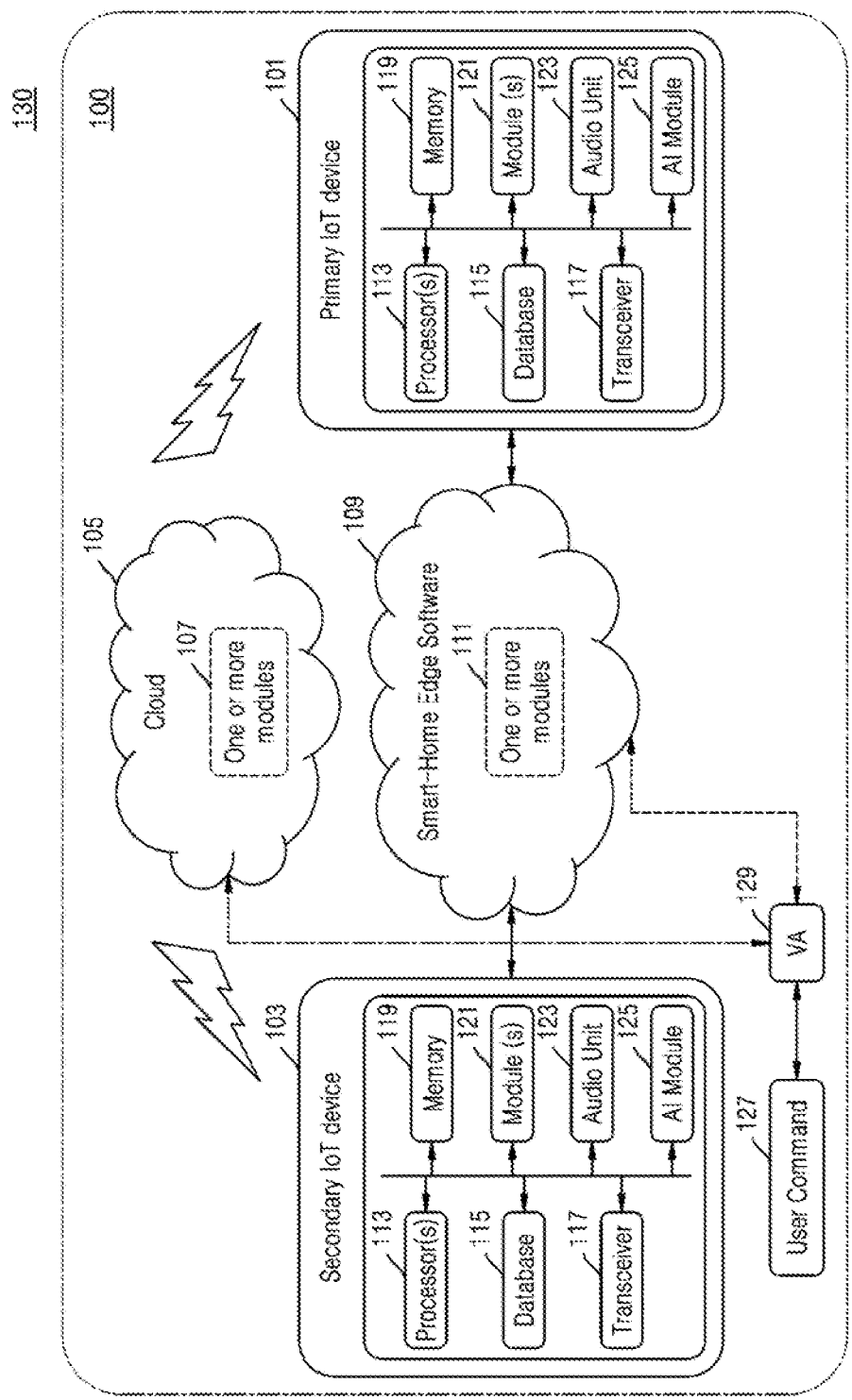
[Figure 1]

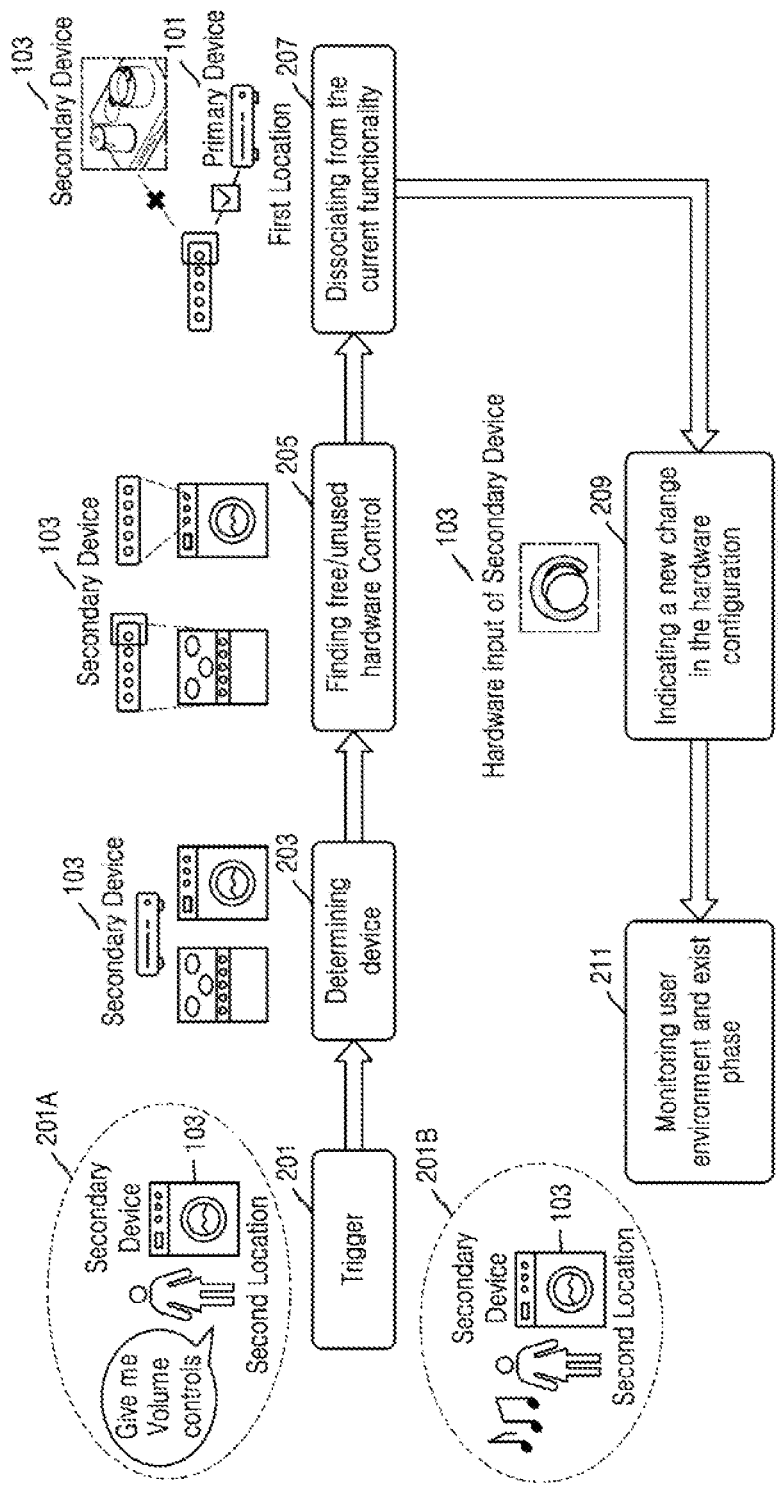
[Figure 2]

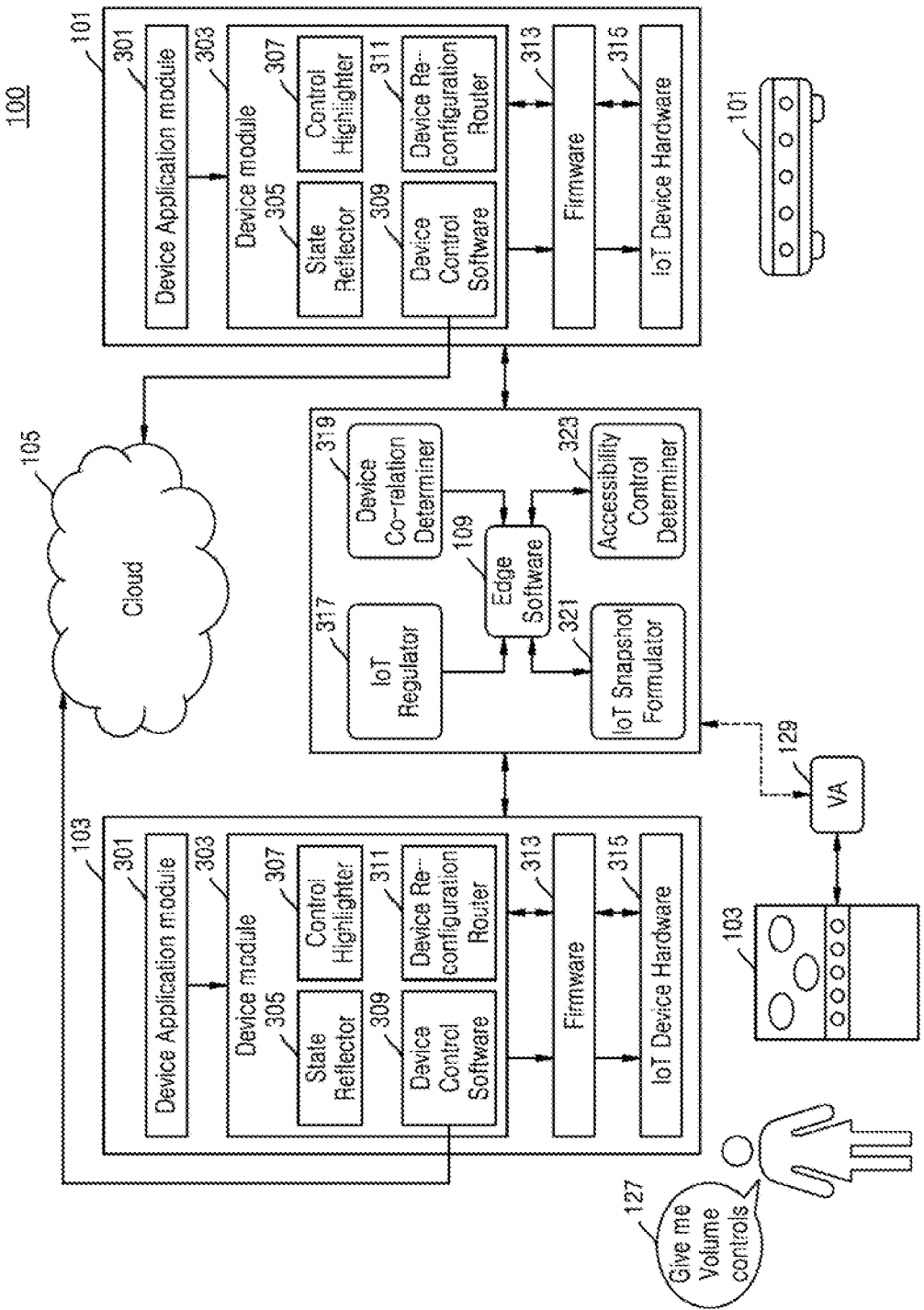
[Figure 3]

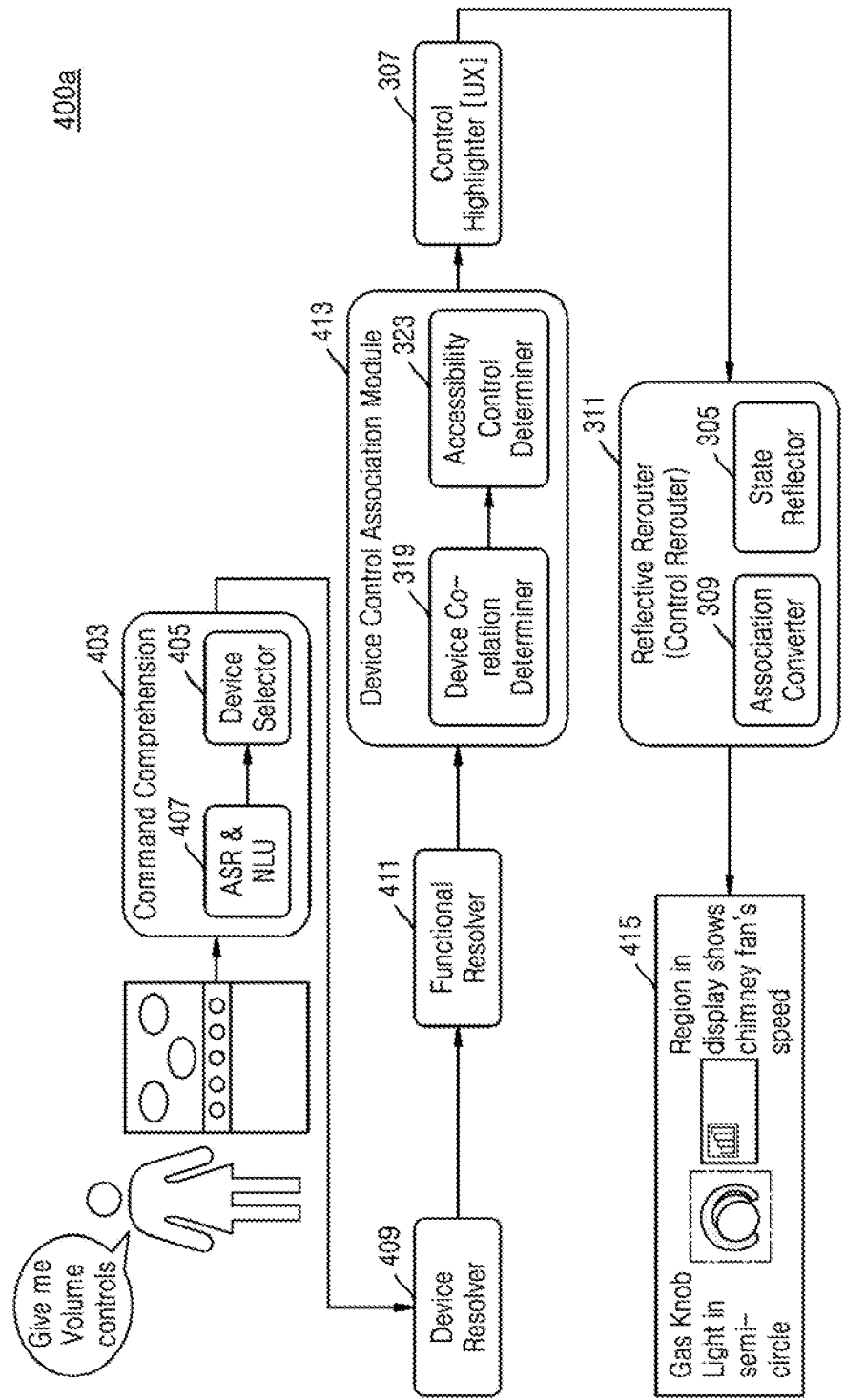
[Figure 4A]

[Figure 4B]
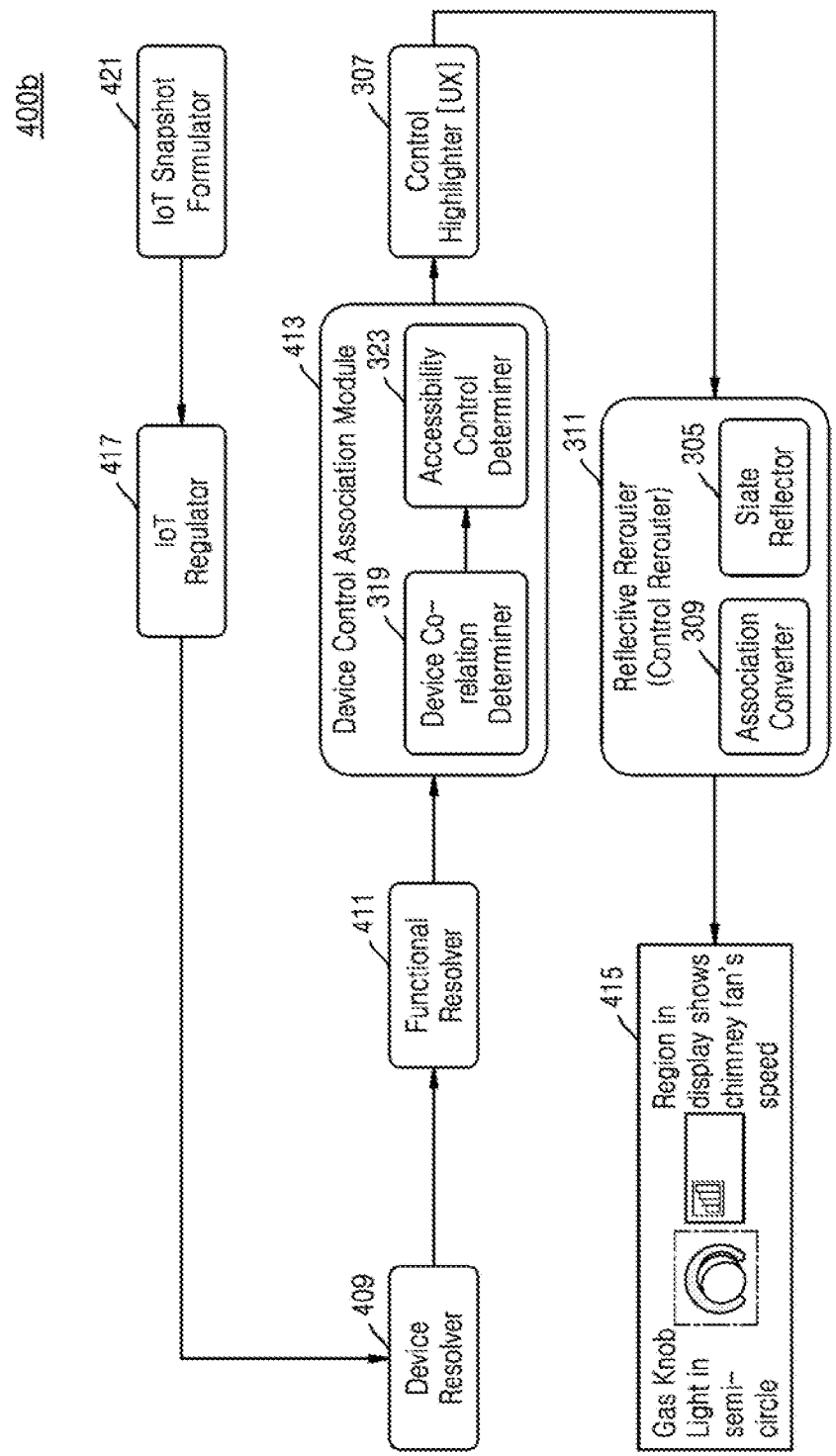

[Figure 5]
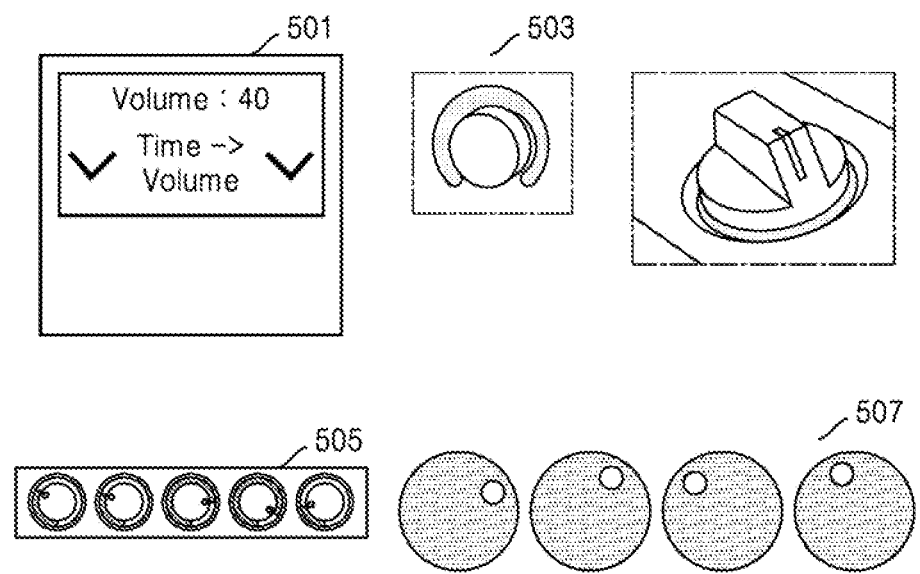

[Figure 6]
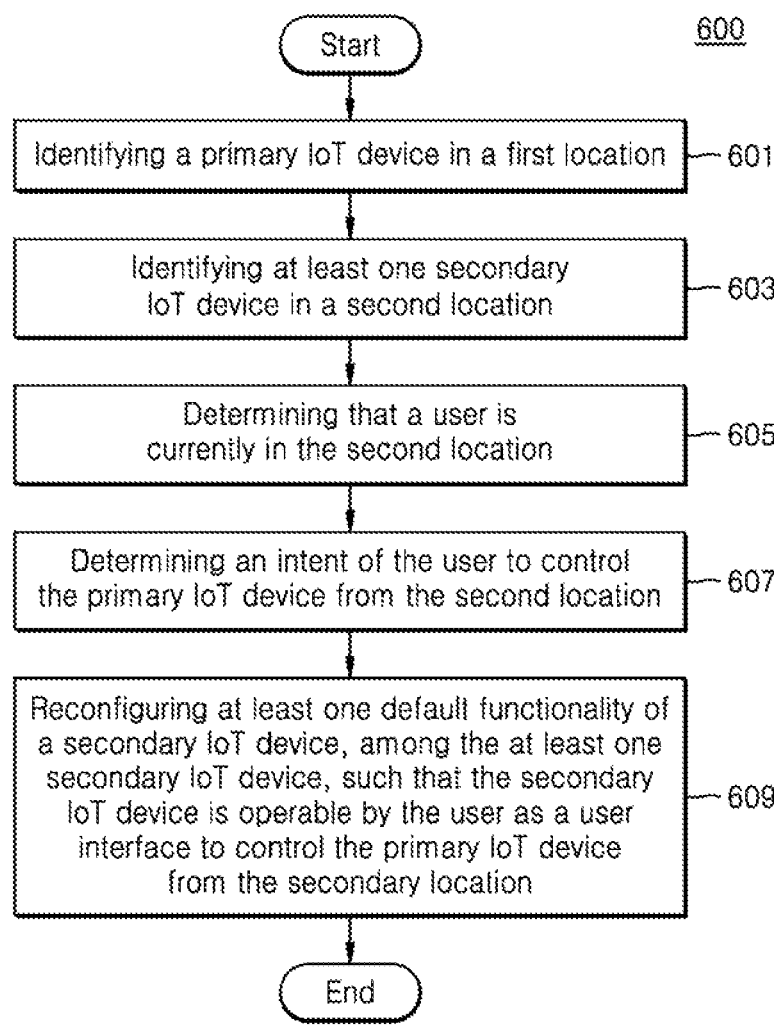

[Figure 7]
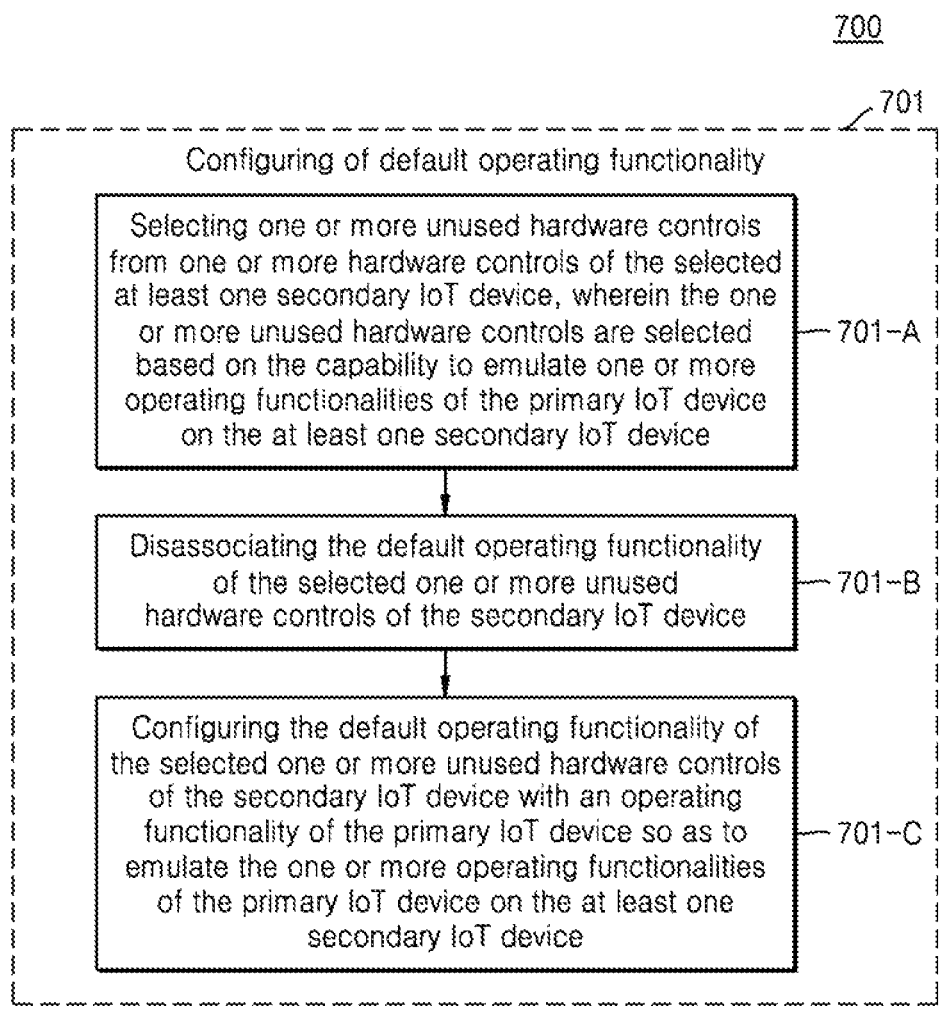

METHOD AND APPARATUS FOR CONTROLLING A REMOTE DEVICE IN AN INTERNET OF THINGS (IOT) ENVIRONMENT

CROSS-REFERENCE TO RELATED APPLICATION

This application is a continuation application of International Application No. PCT/KR2022/014647, filed on Sep. 29, 2022, which claims priority from Indian Patent Application No. 202141044967, filed on Sep. 30, 2021, the disclosures of which are herein incorporated by reference in their entireties.

BACKGROUND

1. Field

Example embodiments of the present disclosure, in general, relate for enhancing user accessibility to devices in an Internet of Things (IoT) environment. More particularly, example embodiments of the present disclosure relate to cloning of functionality of an IoT device by dissociating hardware through input remapping, discernment, and rerouting the IoT device in an IoT environment.

2. Description of the Related Art

With the recent developments in electronic devices, interactive computer systems for example, virtual assistant (VA) devices have evolved to assist users to perform various activities. The virtual assistant devices are generally included in an electronic device as a device functionality. The electronic devices including the virtual assistant devices operate in an Internet of Things (IoT) environment and may be referred as IoT devices, or devices throughout the disclosure without deviating from the scope of the disclosure.

The VA generally assists the user to control IoT devices. As an example, the user may control an AC irrespective of the user's current location by utilizing the VA. As a further example, the user may utilize multiple methods to control various IoT devices. The methods may include, for example but are not limited to, providing voice commands, using a user interface (UI), any application program interface, or utilizing augmented reality (AR) devices.

As an example, consider a scenario where the user is in a living room and the user wishes to control an air conditioner (AC) located at another room. The user may control the AC by providing the voice command. However, controlling the IoT devices via voice command is slower. Also, the user may find it difficult to continuously control the AC over the voice command. Thus, in such a situation, the user may prefer to utilize hardware devices and/or inputs of a nearby IoT device to perform the control operations on the IoT device in another room.

By referring to the same above-mentioned exemplary scenario, where the user is in the living room and the user wises control the AC located in another room, the user may control the AC by using a user interface (UI) or any application program interface. However, the user may find it difficult to control a temperature of the AC continuously over a UI as a display may not be available to the user. Thus, it may be difficult to regularly control IoT devices which are not near to the user or are in a remote location (e.g., different rooms). Thus, in such a situation, the user may prefer to utilize hardware devices/inputs of nearby devices to perform the control operations on IoT devices.

As another exemplary implementation, in continuation of the same above-mentioned example, the user in the living room may control the AC located in another room by utilizing augmented reality (AR) devices. However, utilizing the augmented reality (AR) devices needs extra accessories. Further, the AR devices are not intuitive and may cause an extra burden to the user if IoT devices are present in the vicinity. Furthermore, the implementation of the AR may become equivalent to using a display or a UI which may cause difficulty to use to the user, as described above.

Accordingly, the user may prefer to control the IoT devices through the hardware device/inputs rather than navigating through any application program interface or a user interface (UI) or display and the like as the hardware buttons are more accessible to the user. However, it may be very difficult for the user to utilize various hardware device/inputs as it is difficult to remember various hardware operation mechanisms and the like. As an example, long press, press twice, etc. functionality increases the cognitive load on the user.

Further, hardware inputs of the IoT device are still limited to controlling the same IoT device in which it is located. Further, the hardware device/inputs are not connected to the internet and hence cannot be reconfigured and utilized with a new differently functionality.

Thus, there are various problems in controlling a remote IoT device as below:

1. Hardware buttons are more accessible to the user than displays.
2. Currently, there is no method to allow precise control over certain functionalities of the remote IoT device that have more than two states.
3. Providing a precise control over certain functionalities through a voice command is very difficult.
4. Using voice commands are not efficient in scenarios where there are constant changes to the IoT device's functionality such as music controls, volume, lighting controls, etc.
5. It is difficult to regularly control IoT devices that are not near to the user or are in different rooms from a room in which the user is located.
6. Currently, there is no method provided to utilize hardware inputs/devices of a nearby IoT device for controlling a remote IoT device located at a remote location but in the same IoT environment. In particular, hardware associated with the IoT device is still limited to controlling the same IoT device in which it is located.

Thus, there is a need for a solution that overcomes the above deficiencies.

SUMMARY

This summary is provided to introduce a selection of concepts, in a simplified format, that are further described in the detailed description of the disclosure. This summary is neither intended to identify key or essential inventive concepts of the disclosure and nor is it intended for determining the scope of the disclosure.

According to an aspect of an example embodiment of the disclosure, provided is a method for controlling a remote device in an Internet of Things (IoT) environment, the method includes identifying a primary IoT device in a first location. The method includes identifying at least one secondary IoT device in a second location. The method includes determining that a user is currently in the second location.

The method includes determining an intent of the user to control the primary IoT device from the second location. And The method includes reconfiguring at least one default functionality of a secondary IoT device, among the at least one secondary IoT device, such that the secondary IoT device is operable by the user as a user interface to control the primary IoT device from the secondary location.

According to an aspect of an example embodiment of the disclosure, provided is an apparatus for controlling a remote device in an Internet of Things (IoT) environment, the apparatus including at least one processor configured to identify a primary IoT device in a first location. The apparatus including at least one processor configured to identify at least one secondary IoT device in a second location. The apparatus including at least one processor configured to determine that a user is currently in the second location; determine an intent of the user to control the first IoT device from the second location. And The apparatus including at least one processor configured to reconfigure at least one functionality of a second IoT device, among the at least one secondary IoT device, such that the second IoT device is operable by the user as a user interface to control the first IoT device from the second location.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, in which:

FIG. 1 illustrates a system for reassigning hardware input controls on user's nearby Internet of Things (IoT) devices to control functionalities of the remote IoT devices, in accordance with an example embodiment of the disclosure;

FIG. 2 illustrates an overview of an operational flow of the system, in accordance with an example embodiment of the disclosure;

FIG. 3 illustrates a detailed block diagram of the system of FIG. 1, according to an example embodiment of the disclosure;

FIGS. 4A and 4B illustrate an explicit and implicit determination of a user intent, according to an example embodiment of the disclosure;

FIG. 5 illustrates an exemplary scenario for the implementation of the control highlighter and an indication phase, according to an example embodiment of the disclosure;

FIG. 6 illustrates a flow diagram, according to an example embodiment of the disclosure; and FIG. 7 illustrates a flow diagram of reconfiguration of at default functionality of IoT device, according to an example embodiment of the disclosure.

DETAILED DESCRIPTION

For the purpose of promoting an understanding of the principles of the disclosure, reference will now be made to the example embodiment illustrated in the drawings to describe example embodiments of the disclosure. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates. Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The terms "functionality" comprises operating functionality.

FIG. 1 illustrates a system 100 to reassign hardware input controls on user's nearby Internet of Things (IoT) devices to control functionalities of remote IoT devices, in accordance with an embodiment of the disclosure. The system 100 may be provided in an IoT environment 130. As an example, it is assumed that a secondary IoT device 103 is nearby a user and a primary IoT device 101 is remote to the user. According to an embodiment, there may be one or more IoT devices present at a nearby location of the user and at the remote location to the user. For example, the remote IoT devices may include IoT devices that are present at another room or at some distant location from the user but within the same IoT environment 130. As an example, the IoT environment 130 may include home environment, office environment and the like. The IoT device 103 which is near to the user may be referred as the secondary IoT device 103 or a secondary device 103 throughout the disclosure without deviating the scope of the disclosure. The IoT device 101 which is remote to the user may be referred as the primary IoT device 101 or a primary device 101 throughout the disclosure without deviating the scope of the disclosure. For the sake of brevity, in FIG. 1, only two IoT devices 101, 103 have been shown, however, there may be more than two IoT devices that may be present in the IoT environment 130. For example, there may be one or more primary IoT devices 101 and one or more secondary IoT devices 103.

As an example, the system 100 may include, for example but not limited to, one or more IoT devices 101, 103, interacting with each other through a virtual assistant (VA) 129. The VA 129 may further interact with a cloud 105 and a smart-home edge software (or referred to as "edge software") 109. The cloud 105 and the smart-home edge software 109 may respectively include one or more modules 107, 111, that perform various operations. As an example, the VA 129 may include, for example but not limited to, a computer interactive system, a virtual assistant system, or an electronic system and the like. According to the present disclosure, the smart-home edge software 109 may be referred as edge software throughout the disclosure without deviating from the scope of the disclosure.

According to an embodiment of the present disclosure, the one or more IoT devices may include the primary IoT device 101 and the secondary IoT device 103. The primary IoT device 101 and the secondary IoT device 103 may include one or more processor(s) 113, a database 115, a transceiver 117, a memory 119, one or more module(s) 121, an audio unit 123, and an artificial intelligence (AI) module 125 that are coupled with each other. As an example, the IoT device 101 or 103 may include, for example but not limited to, a washing machine, a television, a mobile device, a speaker, a refrigerator, an air conditioner, a heating appliance, a monitoring system, a home appliance, an alarm system, a sensor, and the like. As a person of ordinary skill in the art would be understood, each of the aforementioned examples may be smart devices that may be connected with one or more remote servers or IoT cloud server. The remote servers or the IoT cloud server may be, for example but not limited to, the cloud 105 or smart-home edge software 109 as shown in FIG. 1. Further, the smart devices may be a part of the IoT environment 130. In an example, the smart-home edge software 109 may be implemented in a hub device or in a computing device.

In an example, the processor 113 may be a single processing unit or a number of units, all of which may include multiple computing units. The processor 113 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, the processor 113 may be configured to fetch and execute computer-readable instructions and data stored in the memory 119.

The memory 119 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memory, a hard disk, an optical disk, and a magnetic tape.

In an example, the module(s) 107, 111, 121 may include a program, a subroutine, a portion of a program, a software component or a hardware component capable of performing a stated task or function. As used herein, a module(s) 107, 111, 121 may be implemented on a hardware component such as a server independently of other modules, or a module may exist with other modules on the same server, or within the same program, or in the cloud 105, the smart-home edge software 109, or on the IoT devices 101, 103. The module(s) 107, 111, 121 may be implemented on a hardware component such as a processor implemented as one or more microprocessors, microcomputers, microcontrollers, digital signal processors, central processing units, state machines, logic circuitries, and/or any devices that manipulate signals based on operational instructions. The module(s) 107, 111, 121, when executed by the processor 113, may be configured to perform any of the described functionalities.

The database 115 may be implemented with integrated hardware and software. The hardware may include a hardware disk controller with programmable search capabilities or a software system running on general-purpose hardware. The examples of database 115 include, but not limited to, in-memory database, cloud database, distributed database, embedded database and the like. The database 115, amongst other things, serves as a repository for storing data processed, received, and generated by one or more of the processors 113, and the modules 107, 111, 121.

The audio unit 123 may include a speaker and/or microphone to produce an audio output and/or receive an audio input respectively. The audio output may be implemented through a number of techniques such as, for example, Automatic Speech Recognition (ASR), Natural Language Understanding (NLU), Natural Language Processing (NLP), Natural Language Generation (NLG), or the like.

The transceiver 117 may be a transmitter and a receiver unit. The transceiver 117 may communicate with the user and/or other IoT devices via any of the wireless standards, such as 3G, 4G, 5G, or the like, other wireless techniques, such as Wi-Fi, Bluetooth, etc. may also be used.

The AI module 125 may include a plurality of neural network layers. Examples of neural networks include, but are not limited to, convolutional neural network (CNN), deep neural network (DNN), recurrent neural network (RNN), Restricted Boltzmann Machine (RBM). The learning technique is a method for training a predetermined target device (for example, a computing device) using a plurality of learning data to cause, allow, or control the target device to make a determination or prediction. Examples of learning techniques include, but are not limited to, supervised learning, unsupervised learning, semi-supervised learning, or reinforcement learning. In an embodiment, at least one of a plurality of CNN, DNN, RNN, RMB models and the like may be used through an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

FIG. 2 illustrates an overview of an operational flow of the system 100 of FIG. 1, in accordance with an embodiment of the disclosure. Referring to FIGS. 1-2, in an implementation, a scenario 201A may be considered in which a user provides a user command 127 to trigger the VA 129 explicitly for an explicit interaction. In an implementation, the edge software 109 handles the triggering operation.

In another implementation, a scenario 201B may be considered in which the user is operating an IoT device while listening to a piece of music. Thus, in the scenario 201B, the edge software 109 may analyze user behavior and operating IoT devices in the IoT environment 130 for performing an implicit triggering operation during an implicit interaction of the user. Accordingly, the edge software 109 may automatically find appropriate hardware control that the user may need to change based on the user behavior analysis after the implicit triggering operation.

As an example, the user command 127 may be provided as a voice command, a text input, a gesture, or via any other electronic/digital devices and the like. The aforementioned user command 127 may be referred to as an explicit command.

As a further example, the implicit interaction may include identifying the user's need or interest for providing control to the user that he may need in some time. For example, in the scenario 201B, the user is operating an IoT device (e.g., secondary device 103) while listening to music as shown in FIG. 2. Thus, the edge software 109 may determine that the user may need to control music tracks and a music volume by analyzing previous user behavior and a current user's ongoing activities. As a further example, the other electronic/digital device via which the user command 127 may be provided may include an IoT device, or smartphone, laptop, tablet, and the like. As an example, the term devices, electronic devices, digital devices, and IoT devices may be alternately used without deviating the scope of the disclosure.

Accordingly, as shown in FIG. 2, at block 201, in the scenario 201A, the user may provide a command explicitly by uttering a preset word such as, for example, "bring control here" or "give me the control" while the user is operating the secondary device 103. As an example, the secondary device 103 is at the second location and the second location may be a location nearby the user. Furthermore, there may be more than one IoT device that may be present at the second location. In an alternate scenario 201B, the user is operating the secondary device 103 while listening to the music.

According to an embodiment, initially, at block 201, the command of the user provides a trigger to the VA 129. In response to the trigger, the VA 129 detects that the user wants to control some functionalities immediately or asking the VA 129 to provide control of certain functionalities of some IoT device over the secondary device 103 or over his or her nearby IoT devices. Accordingly, a user intent to control the secondary device 103 in the second location is determined. In this example, an explicit way of determining the user intent to operate the secondary device 103 is determined. Alternately, when the edge software 109 analyzes the user behavior to determine the user intent, then such determination may be referred as an implicit way of determining the user intent. The implicit or the explicit way of determining the user intention will be explained in detail below. Accordingly, based on the user intention, an functionality that the user wants to control is determined. As an example, that the user wants to control a volume of music which is at a different room is determined during the explicit interaction. As an alternate example, that the user wants to control the volume of the music is determined during the implicit interaction.

Thereafter, at block 203, the system 100 determines an IoT device(s) and the controls on the corresponding IoT device(s) that the user may want to control and/or change. This may be performed by the module 107 and/or the module 111 at the cloud 105 and/or smart-home edge software 109, respectively. Thereafter, at block 205, the system 100 determines controls on the IoT device(s) that is at the second location. As an example, the system 100 may determine controls which are currently free/unused or may become free after a particular time or that may emulate the determined functionalities. Thereafter, at block 207, the system 100 reconfigures the hardware input control of the secondary device 103 to be disassociated from its current functionality and to be configured with the functionality of the primary device. Further, after reconfiguring the hardware input control of the secondary device 103 with the functionality of the primary device 101, the system 100 links a state change of the secondary device 103 to the newly determined functionality of the primary device 101.

As an example, if the user is currently operating a cooking stove at a kitchen and wants to control the music system from the kitchen, then according to an implementation of the block 207, the functionality of to cooking stove knob(s) may be reconfigured with the operating function of a volume switch of the music system. Further, the cooking stove knob(s) may represent a state change corresponding to the newly determined functionality. Accordingly, in the current example, it is assumed that the user is located at or near the second location; the cooking stove may be the secondary device 103 located at the second location; the music system may be located at a first location that is away from the user, and the music system may be the primary device 101 located at the first location.

As an example, in an implicit interaction, if the user is currently operating a washing machine at a laundry room and wants to control the music volume of the music system at the living room while being at the laundry room, then according to the implementation of the block 207, the functionality of the washing machine knob(s) may be reconfigured with the operating function of a volume switch of the music system. Further, the washing machine knob(s) may represent a state change corresponding to the newly determined functionality. Accordingly, in the current example, the user location may be referred as the second location, the washing machine may be referred as the secondary device 103, the music system location may be referred as the first location, and the music system may be referred as the primary device 101.

According to an example embodiment, at block 209, the secondary device 103 may indicate a new state change in the hardware configuration of the primary device 101 to the user. The indication of the new state change may be performed by using hardware controls or by using animation in hardware control that reflects the new state. Thereafter, at block 211, the system 100 may continuously monitor the user's IoT environment and determine if the reconfigured hardware control needs to be shifted to any other nearby IoT device in case the user moves from its current position or control needs to be re-associated to the original one. Thus, a user is able to operate the remote IoT devices using the hardware feature of the currently used or nearby IoT devices. A detailed implementation of each of the components will be explained in detail below.

FIG. 3 illustrates a detailed block diagram of the system 100, according to an embodiment of the present disclosure. An explanation will be made with reference to FIGS. 1-3 wherever applicable for the ease of explanation. Further, the same reference numerals may be used wherever applicable throughout the disclosure for the sake of simplicity.

FIG. 3 illustrates a detailed architecture of the IoT device 101, 103. In FIG. 3, the primary and the secondary IoT devices 101, 103 may include a device application module 301, a device module 303, a firmware 313, IoT device Hardware 315 are communicatively coupled with each other. As an example, the device application module 301 may be a UI/user experience (UX) of the primary or secondary IoT device's 101, 103. The UI/user experience (UX) may be utilized for displaying the user for performing various operations. In an implementation, the device module 303 operates the primary and the secondary IoT devices 101, 103 from the cloud 105, the edge software 109, and IoT devices.

According to an embodiment of the present disclosure, the device module 303 may include various modules, for example, a state reflector 305, a control highlighter 307, a device control software 309, a device reconfiguration router 311 that are communicatively coupled with each other. The detailed implementation of the same will be explained in detail below. The firmware 313 may be a device firmware or a device driver that operates an actual hardware control of the primary and the secondary IoT devices 101, 103 and provide a status of the actual hardware control back to the device module 303. According to an embodiment, the IoT device hardware 315 corresponds to the actual hardware control of the primary and the secondary IoT devices 101, 103 that may be manipulated, or reassigned, or configured according to the user's command as explained in FIG. 2 above. For example, the knob of a gas stove, switches of an LED screen, and the like may be reassigned with the newly determined functionality as explained in FIG. 2 above. According to an embodiment, the device reconfiguration router 311 may be configured to change the hardware control of the secondary IoT device 103 by utilizing the device control software 309.

According to an embodiment of the present disclosure, initially the user may interact with the device application module 301 via UI/UX interfaces. Thereafter, the device application module 301 uses the state reflector module 305 to sync a state change in software to the current hardware state. Further, as the user provides the user command 127, the user command 127 may be interpreted by the VA 129 and thereafter transmitted to the device module 301 for its implementation in software and hardware components. In particular, the VA 129 interprets the command and uses the cloud 105 or the edge network 109 to send the command 127 to the secondary IoT devices 103.

According to an embodiment of the present disclosure, the device module 301 syncs the state between the software change and the current hardware state after determining the user intention and reconfiguring the secondary device 103 hardware. Thereafter the device module 301 sends the new state to the firmware 313 such that the new state may be reflected in the hardware of the secondary device 103. Thus, after reconfiguration, the user manually changes the hardware state of the secondary device 103 to operate or control the primary device 101 from the second location. Further, firmware 313 detects the user operation associated with the hardware change and communicates to the state reflector 305 to reflect the changed state according to the user operation. This enhances the user experience of operating IoT devices which are at a remote location from his or her current location by utilizing hardware inputs/devices of the nearby IoT devices.

FIG. 4A illustrates an explicit way of determining the user intention, according to an embodiment of the present disclosure. A method 400a as shown in FIG. 4A may be implemented at the system 100 as described above. The method will be explained with reference to FIGS. 1-4A.

According to an embodiment of the present disclosure, consider a scenario when the user wants to control a music system at a remote location from the user's current location. Further, consider that the user may be operating a gas stove. As an example, the music system may be referred as the primary device, the remote location may be referred as the first location, the user location may be referred as the second location or the current location, and one or more IoT devices which is at the nearby or vicinity of the user may be referred as the secondary device. Further, the method 400a may be implemented in the IoT environment.

Further, as an example, consider that the user is operating the gas stove. Furthermore, consider that the user wishes to operate a music system from the second location. In an implementation, the user initiates an action and provides a voice command by uttering a preset word, e.g., "bring the music controls here". A command comprehension module 403 included in the VA 129 may be triggered. The command comprehension module 403 includes an ASR and NLU 407 and a device selector 405. The ASR and NLU 407 may be configured to process the voice command of the user to provide the output to the device selector 405 for further processing. Further, the device selector 405 may be configured to identify one or more nearby IoT device(s) (for example, one or more nearest IoT devices from the user) as a secondary IoT device that may resolve the command via the IoT device control that user wants to operate with. Accordingly, the command comprehension module 403 determines the user intended IoT device and/or action(s) in an explicit way.

In an implementation, the output of the command comprehension module 403 is provided to a device resolver 409 as an input for determination of one or more functionalities. Further, based on the input, the device resolver 409 may determine one or more primary IoT devices 101 that the user wants to control. Example outputs of the device resolver 409 are depicted in Table 1 below.

TABLE 1

| Devices | Music system | Chimney |
|---|---|---|
| Locations | Living Room (LR1) | Kitchen (K2) |

According to an embodiment, the device resolver 409 may provide the output to a functional resolver 411. In an implementation, the functional resolver 411 determines one or more functionalities that the user may control and wants to control on one or more IoT devices as the primary device 101. Accordingly, the functional resolver 411 may be configured to determine the one or more functionalities of the intended primary IoT device 101 so that an appropriate secondary IoT device 103 may be selected for configuring its operation. Example outputs of the functional resolver 411 are depicted in Table 2 below.

As an example, the functional resolver 411 may determine the functionalities of the music system or a chimney as the primary IoT device that may be implemented in either in a gas stove or in a coffee machine or in any nearby IoT device(s) of the user as the secondary IoT device.

TABLE 2

| Device | Associated Control/functionality | Locations |
|---|---|---|
| Music System (Primary device) | Volume | Living Room (LR1) |
| Chimney (Primary device) | Air Flow Speed | Kitchen (K2) |

According to an embodiment of the present disclosure, a device control association module 413 includes a device co-relation determiner 319 and an accessibility control determiner 323. In an implementation, the device co-relation determiner 319 may be configured to select one or more secondary IoT devices 103 that are nearby the user based on the functionalities of the primary IoT device. Thereafter, the accessibility control determiner 323 maps one or more hardware controls of the selected secondary IoT devices 103 with the one or more functionalities of the primary IoT device 101. In an implementation, the accessibility control determiner 323 identifies at least one IoT device as the secondary IoT device 103 that has hardware control whose current state may be converted into a new state of the primary IoT device 101 and then determines the nearby (e.g., nearest) IoT secondary device 103 whose hardware buttons may be used to control the functionality requested by the user according to its nearest accessibility and the mapping.

The identified secondary IoT device 103 may emulate the functionality of primary IoT device 101. In the exemplary case, the knob(s) of the gas stove or coffee machine may be selected to control the volume of the music system. Example outputs of the device control association module 413 are depicted at Table 3 below. Thus, as an example, the gas stove or the coffee machine may be selected as the secondary device for performing the operation of the music system as the primary device 101.

TABLE 3

| Device | HW Control | Assoc. Control | Locations |
| --- | --- | --- | --- |
| Gas Stove | Knob 3 | Volume | K2, Lower |
| Coffee Machine | Up/Down Arrow Keys | Chimney Speed | K2, Mid |

After selecting at least one secondary IoT device 103, e.g., a gas stove, the device control association module 413 enables the at least one functionality of the one secondary IoT device 103 to be operable with the one new functionality that emulates one or more functionalities of the primary IoT device 101, to operate and/or control the primary IoT device from the second location thereby reconfiguring/configuring the secondary IoT device 103.

According to an embodiment of the present disclosure, the control highlighter 307 determines a control that needs to be changed to reflect the selected hardware control on the secondary device 103 via an indicator. As an example, the indicator indicates at least one association of the determined one or more functionalities of the primary IoT device 101 with the selected secondary device, a change in the operational capability on the secondary IoT device 103 due to change in a hardware state of the secondary IoT device 103 based on the operational capability of the primary IoT device 101, and switching back the functionalities to the default functionality. As an example, the default functionality may be an original operating functionality of the at least one secondary IoT device that was previously performed at the time of reconfiguring.

According to an embodiment of the present disclosure, the output of the control highlighter 307 is provided to the device reconfiguration router 311 as shown in FIG. 3. Alternatively, the device reconfiguration router 311 may be referred as a reflective rerouter 311 and may include the state reflector 305 and an association convertor (or device control software) 309. In an implementation, the state reflector 305 may reflect the indication that is determined by the control highlighter 307, via an indicator, that is, the configured at least one new functionality on the selected at least one secondary IoT device.

In an implementation, the association convertor 309 may change the control (hardware) on the selected secondary IoT device 103 in a way that represents the current state of the functionality and delinks/dissociate the hardware control, set up a pipeline that may monitor and reroute the control changes from the user on the hardware and convert the control changes to the actual functionality changes.

FIG. 5 illustrates an exemplary scenario for the implementation of the control highlighter and an indication phase, according to an embodiment of the present disclosure. According to the scenario as shown in FIG. 5, the control highlighter 307 uses the LED lights around the control to show a state change of the button as shown in block 503. Thus, the LED lights around the control may be used to indicate new functionality such as volume controls, and brightness of the LED lights may increase or decrease as the music volume increases or decreases. Further, the device's display may show the current status and the remapped button as shown in the block 501. Furthermore, block 507 shows hardware control (e.g., knob) of the IoT device. Further, the control highlighter 307 may animate the hardware device/inputs, to show the state change to the user. As an implementation, the selected control and the device are indicated to the user for a certain period of time. Example outputs of the reflective rerouter 311 are depicted in Table 4 and at the block 415.

TABLE 4

| HW Control | State | Delink/Disassociation | Conversion |
| --- | --- | --- | --- |
| K3 Light | 50, Volume | Gas Volume Control | Dial 2 Points = 1 Volume Point |
| Display | ¾, [Chimney Speed, 4 bars] | Removed Region | 1 Display Unit = 2 Fan speed units + Light Brightness |

According to an embodiment, the association convertor 309 may be configured to change the hardware state of the secondary IoT device 103 made by the user into an appropriate value for the primary device's functionality. The system 100 may further reconfigure back at least one new functionality into at least one default functionality on the selected secondary IoT device. Thereafter, at least one default functionality of the selected secondary IoT may be enabled after analyzing the user behavior.

FIG. 4B illustrates an implicit way of determining the user intention, according to an embodiment of the present disclosure. A method 400*b* as shown in FIG. 4B may be implemented at the system 100 as shown above. The method will be explained through FIGS. 1-4B.

According to an embodiment of the present disclosure, consider a scenario when the user is working on the gas stove and consider that the user usually listens to a music while working at a kitchen. Thus, in such a scenario, the intention of the user is determined in an implicit way.

According to the embodiment of the present disclosure, a determination of the user intent to operate the primary IoT 101 device at the first location may be implicitly made by analyzing a plurality of parameters associated the user. The plurality of the parameter may include, for example, the user's past behavior, a number of active devices in the IoT environment, the user's current location, a number of unused IoT devices near the user, a number of recent IoT devices user is operating. In such a scenario, the edge software 109 may automatically initiate/trigger its action explicitly.

According to an embodiment of the present disclosure, for determining the user intent explicitly, an IoT snapshot formulator 421 may analyze user behavior and operating IoT devices to determine which IoT devices may be operated. The output of the IoT snapshot formulator 421 is shown in Table 5 below. As an example, the IoT snapshot formulator 421 may analyze the user behavior as cooking, or in a party mood or working on a gas stove or in a laundry room and the like.

TABLE 5

| Behavior | Cooking, Party Mood, Chill, Music, washing |
| Devices | Stove, speaker, washing machine |

Thereafter, the output the IoT snapshot formulator 421 may be provided to an IoT regulator 417. Further, the IoT regulator 417 may identify all prominent controls that a user may need to change based on the current user behavior to determine the intent of the user.

As an example, the output of the IoT regulator 417 is being depicted in Table 6 below. Thus, based on an analysis of the user behavior, it may be determined what IoT control operation the user wants to control and the user's intention.

TABLE 6

| Intent (Implicit user intent determination) |
| IoT Action |

As an example, the one or more functionalities are, for example, increasing the volume of a TV or music system or operating a gas stove or a washing machine and the like.

As a further example, an implicit determination of user intent for controlling the one or more functionalities may include determining the one or more functionalities of the primary IoT device 101 that the user frequently utilizes based on at least one parameter from the one or more parameters. As an example, when the user listens to music while working on the laundry room, the user intention may be for controlling a volume of an IoT device that is determined by the IoT snapshot regulator 417.

As a further example, an implicit determination of user intent for controlling the one or more functionalities may include detecting a change in the state of at least one IoT device in the IoT environment that leads the user to change some functionalities of one of the primary IoT device. As an example, the user is about to complete a job at the kitchen and after stopping at the chimney the user listens or operates a music system. Based on the change in the environment, the IoT snapshot regulator 417 determines the user intent. As a further example, the user may be working in the laundry room and operating the washing machine. The user is also listening to music from a music system that may be in a different room. Thus, the user intent may be determined based on the previous user behavior and the current ongoing activity of the user.

The output as shown in Table 6 is then provided to the device resolver 409 to perform a further process. The operations of the device resolver 409, the functional resolver 411, the device control association module 413, the control highlighter 307, the reflective rerouter 311 may be the same as explained in FIG. 4A. Hence for the sake of brevity, it is not again explained herein.

FIG. 6 illustrates a flow diagram, according to an embodiment of the present disclosure. A method 600 as shown in FIG. 6 may be implemented at the system 100 as described above. The method 600 will be explained with reference to FIGS. 1-6.

At step 601, the method 600 identifies a primary IoT device in a first location. Thereafter, at step 603, the method 600 identifies at least one secondary IoT device 103 is in a second location. Thereafter, at step 605, the method 600 determines that a user is currently in the second location.

Thereafter, at step 607, the method 600, determines an intent of the user to control the primary IoT 101 device from the second location. In particular, the determination of the user intent includes determining the user intent to control primary IoT device 101 at the first location explicitly based on a reception of the user command 127 via, for example, at least one of a voice command, a user input via a graphical user interface (GUI), via hardware. Alternatively, the method 600 determines the user intent to control primary IoT device at the first location implicitly by analyzing a plurality of parameters associated with at least one of the user's past behavior, a number of active devices in the IoT environment, the user's current location, a number of unused IoT devices near the user, a number of recent IoT devices user is operating, etc. The explicit and implicit way of determining the user intent is explained in FIGS. 4A and 4B. Therefore, for the sake of brevity, the explanation of the same has been omitted here.

In an implementation, the method 600 determines one or more functionalities associated with the primary IoT device 101 for the control of the primary IoT device 101 based on the determined intent of the user. In particular, the determination of the one or more functionalities includes determining the one or more functionalities of the primary IoT device 101 that the user frequently utilizes based on at least one parameter from the one or more parameters. Thereafter, the method 600 performs mapping of the one or more hardware controls of the selected at least one secondary IoT device with the determined one or more functionalities of the primary IoT device.

The method 600 may select at least one secondary IoT device 103 at the second location based on a capability to emulate one or more functionalities of the primary IoT device 101 on the at least one secondary IoT device 103. The method 600 may enable the at least one functionality of the selected at least one secondary IoT device to be operable as the at least one new functionality that emulates one or more determined functionalities of the primary IoT device for control the primary IoT device from the second location.

After enabling the at least one functionality of the selected at least one secondary IoT device, the method 600 may include step 609 of reconfiguring at least one default functionality of a secondary IoT device 103, among the at least one secondary IoT device, such that the secondary IoT device 103 is operable by the user as a user interface to control the primary IoT device 101 from the secondary location.

FIG. 7 illustrates an operational flow of reconfiguration of at least one default functionality of the secondary IoT device with the primary IoT device, according to an embodiment of the present disclosure. A method 700 as shown in FIG. 7 illustrates the operational flow of reconfiguration of at least one default functionality of the secondary IoT device with the primary IoT device included in step 609 of FIG. 6. In particular, the reconfiguring, at step 609, of at least one default functionality of the secondary IoT device 103 may include configuring at step 701 the at least one default functionality into at least one new functionality that emulates one or more functionalities of the primary IoT device 101 on the selected at least one secondary IoT device 103.

In an implementation, the configuring at step 701 of the at least one default functionality of the selected at least one secondary IoT device 103 includes first selecting, at step 701-A, one or more unused hardware controls from one or more hardware controls of the selected at least one secondary IoT device 103. Further, the one or more unused hardware controls are selected based on the capability to emulate one or more functionalities of the primary IoT device 101 on the at least one secondary IoT device 103. Thereafter, at step 701-B, the method 700 performs disassociating the default functionality of the selected one or more unused hardware controls of the secondary IoT device 103. Then, at step 701-C, the method 700 performs configuring the default functionality of the selected one or more unused hardware controls of the secondary IoT device 103 with an functionality of the primary IoT device so as to emulate the one or more functionalities of the primary IoT device 101 on the at least one secondary IoT device 103. As an exemplary implementation, step 609 may be performed by the device control association module 413 and the device reconfiguration router 311 or the reflective rerouter 311.

In an implementation, the method 400 may further include reconfiguring back at least one new functionality into at least one default functionality on the selected secondary IoT device. As an example, the reconfiguring back operation may be performed by the reflective rerouter 311. Thereafter, at least one default functionality of the selected secondary IoT may be enabled after analyzing the user behavior.

In an implementation, the method 600 may further include indicating, via an indicator, the configured at least one new functionality on the selected at least one secondary IoT device, wherein the indication comprises at least one of association of the determined one or more functionalities of the primary IoT device on the selected secondary device, a change in the operation capability of the primary IoT device on the secondary device due to a change in a hardware state of the secondary IoT device, and switching back the functionalities on the at least one secondary IoT device to the default functionality. The indication phase has been explained in FIGS. 4A, 4B, and 5.

Various exemplary scenarios for implementing the system 100 will be explained in detail below. As an example use case, consider that the user is cooking in a kitchen and wants to control the volume of the music system in the living room. The method 600 determines the corresponding device to control the music system and determines how to make the control prominent. For example, after reconfiguring the hardware device (e.g., control knobs) of the stove, a knob of the stove may now control the volume of the music system. Thus, a change in a knob position may represent the control of the volume of the music system. Further, according to a change of control made by the user, the knobs may light up to show prominence associated with the change.

Further, according to another example use case, consider that the user is in a bathroom and gives a command to the VA in the next room and the user wants to know what is happening with the VA. Here, the VA's processing, listening, and the replying stages may be shown using hardware controls on a washing machine in the bathroom. Thus, the current use case indicates an intermediate state of another IoT device through reconfiguration of controls.

Further, according to yet another example use case, consider that the user has just put clothes to wash and wants to be aware of the cycles/timings remotely through lights at the user's nearby location. Thus, the system 100 sets the light bulb in the room to show the timer. In particular, a change in the light bulb color may indicate the cycles/timings controls on the washing machine. As an example, red color may indicate is start operation and yellow color may indicate that washing the clothes are completed and the like.

As a further example, according to another example use case, consider that the user is watching TV in a living room and wants to change an air swing direction of an air conditioner to be away from the user's face. Thus, system 100 sets the swing direction of air conditioner, e.g., toward the user's feet by controlling the swing through TV's remote control. Thus, according to the current use case the system 100 converts discreet inputs to continuous input value through remapping.

As described above, the system according to an example embodiment may identify the intent of a user (explicit or implicit) present at the second location to control the target IoT device located at the first location and determine one or more associated controls of the target IoT device required by the user. For example, the user is in the kitchen and needs to control the volume of the sound system in the living room. In this case, the user needs volume controls of the sound system in the living room from the kitchen. As another example, the user is in the living room and needs to control the blinds in the bedroom (e.g., to wake someone up). Then, the system may select hardware controls of one or more nearby devices present at the second location that may emulate user's required controls of the target IoT device. For example, the stove's knob may be used to mimic volume controls of the sound system present in the next room, a microwave button may be used to control chimney's speed or a watch's bezel may be reassigned to use to control a curtain. The system may configure the selected hardware controls of at least one nearby device to match the current state of the target IoT device, wherein configuring may include an indication of the selected hardware controls to the user, e.g., using the lights of the stove's knob to indicate volume level or audio frequency, animating the stove's knob control to move according to the audio frequency.

Thus, the present disclosure helps a user to control far-away primary devices with hardware inputs of nearby secondary devices through remapping of hardware controls. This significantly helps in bringing a unique value for smart devices and further enhances the user experience.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

The operations of any flow diagram need not be implemented in the order shown; nor do all of the operations necessarily need to be performed. Also, operations that are not dependent on other operations may be performed in parallel with the other operations. The scope of the disclosure is by no means limited by these specific examples. Numerous variations, whether explicitly given in the specification or not, such as differences in structure, dimension, and use of material, are possible.

Benefits, other advantages, and solutions to problems have been described above with regard to example embodiments. However, the benefits, advantages, solutions to problems, and any component(s) that may cause any benefit, advantage, or solution to occur or become more pronounced are not to be construed as a critical, required, or essential feature or component of any or all the claims.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

While specific language has been used to describe the example embodiments, any limitations arising on account thereto, are not intended. As would be apparent to a person in the art, various working modifications may be made to the method and the apparatus in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

A method for controlling a remote device in an Internet of Things (IoT) environment, the method comprises identifying a primary IoT device in a first location, identifying at least one secondary IoT device in a second location, determining that a user is currently in the second location, determining an intent of the user to control the primary IoT device from the second location and reconfiguring at least one default functionality of a secondary IoT device, among the at least one secondary IoT device, such that the secondary IoT device is operable by the user as a user interface to control the primary IoT device from the secondary location.

The method further comprises determining at least one functionality of the primary IoT device based on the determined intent of the user and selecting the secondary IoT device, among the at least one secondary IoT device at the second location, based on a capability of the selected secondary IoT device to emulate the at least one functionality of the primary IoT device, wherein the reconfiguring comprises reconfiguring the at least one default functionality of the selected secondary IoT device to emulate the at least one functionality of the primary IoT device.

The reconfiguring comprises configuring the at least one default functionality of the secondary IoT device into at least one new functionality that emulates at least one functionality of the primary IoT device.

The method further comprises mapping at least one hardware control of the secondary IoT device with at least one functionality of the primary IoT device.

The configuring the at least one default functionality of the secondary IoT device into the at least one new functionality comprises selecting at least one unused hardware control, from at least one hardware control of the secondary IoT device, based on a capability of the secondary IoT device to emulate the at least one functionality of the primary IoT device, disassociating a default functionality of the selected at least one unused hardware control of the secondary IoT device and configuring the default functionality of the selected at least one unused hardware control of the secondary IoT device with to emulate the at least one functionality of the primary IoT device.

The determining the intent of the user comprises determining the intent of the user to control the primary IoT device at the first location based on a user command received via at least one of a voice command, a user input via a graphical user interface (GUI), or hardware.

The determining the intent of the user comprises determining the intent of the user to control the primary IoT device at the first location based on analyzing at least one parameter associated with at least one of a past behavior of the user, a number of active devices in the IoT environment, a current location of the user, a number of unused IoT devices near the user, or a number of IoT devices recently operated by the user.

The method further comprises determining the at least one functionality of the primary IoT device that is frequently utilized by the user based on the at least one parameter, wherein the reconfiguring comprises reconfiguring the at least one default functionality of the secondary IoT device to emulate the determined at least one functionality of the primary IoT device.

The determining the at least one functionality of the primary IoT device comprises detecting a change in a state of at least one IoT devices in the IoT environment, and determining the at least one functionality of the primary IoT device based on the detected change.

The method further comprises identifying the secondary IoT device based on a hardware control of the secondary IoT device of which a current state is convertible into a new state of a capability of the primary IoT device and mapping the hardware control of the identified secondary IoT device with the new state of the capability of the primary IoT device.

The method further comprises providing, via an indicator, an indication of at least one reconfigured functionality on the secondary IoT device, wherein the indication comprises at least one of an association of at least one functionality of the primary IoT device with the secondary IoT device, a change in an operation capability of the primary IoT device on the secondary IoT device due to a change in a hardware state of the secondary IoT device, or switching back the at least one reconfigured functionality to the at least one default functionality of the secondary IoT device.

The method further comprises switching back at least one reconfigured functionality into the at least one default functionality of the secondary IoT device.

The at least one default functionality corresponds to an original functionality of the at least one secondary IoT device that was previously performed at a time of the reconfiguring.

An apparatus for controlling a remote device in an Internet of Things (IoT) environment, the apparatus comprising at least one processor configured to identify a primary IoT device in a first location, identify at least one secondary IoT device in a second location, determine that a user is currently in the second location, determine an intent of the user to control the first IoT device from the second location and reconfigure at least one functionality of a second IoT device, among the at least one secondary IoT device, such that the second IoT device is operable by the user as a user interface to control the first IoT device from the second location.

The at least one processor is further configured to determine at least one functionality of the primary IoT device based on the determined intent of the user, select the secondary IoT device, among the at least one secondary IoT device at the second location, based on a capability of the selected secondary IoT device to emulate the at least one functionality of the primary IoT device and reconfigure the at least one default functionality of the selected secondary IoT device to emulate the at least one functionality of the primary IoT device.

The at least one processor is further configured to configure the at least one default functionality of the secondary IoT device into at least one new functionality that emulates at least one functionality of the primary IoT device.

The at least one processor is further configured to map at least one hardware control of the secondary IoT device with at least one functionality of the primary IoT device.

The at least one processor is further configured to select at least one unused hardware control, from at least one hardware control of the secondary IoT device, based on a capability of the secondary IoT device to emulate the at least one functionality of the primary IoT device, disassociate a default functionality of the selected at least one unused hardware control of the secondary IoT device and configure the default functionality of the selected at least one unused hardware control of the secondary IoT device with to emulate the at least one functionality of the primary IoT device.

The at least one processor is further configured to determine the intent of the user to control the primary IoT device at the first location based on a user command received via at least one of a voice command, a user input via a graphical user interface (GUI), or hardware.

The at least one processor is further configured to determine the intent of the user to control the primary IoT device at the first location based on analyzing at least one parameter associated with at least one of a past behavior of the user, a number of active devices in the IoT environment, a current location of the user, a number of unused IoT devices near the user, or a number of IoT devices recently operated by the user.

The at least one processor is further configured to determine the at least one functionality of the primary IoT device that is frequently utilized by the user based on the at least one parameter and reconfigure the at least one default functionality of the secondary IoT device to emulate the determined at least one functionality of the primary IoT device.

The at least one processor is further configured to detect a change in a state of at least one IoT devices in the IoT environment, and determine the at least one functionality of the primary IoT device based on the detected change.

The at least one processor is further configured to identify the secondary IoT device based on a hardware control of the secondary IoT device, of which a current state is convertible into a new state of a capability of the primary IoT device and map the hardware control of the identified secondary IoT device with the new state of the capability of the primary IoT device.

The at least one processor is further configured to provide, via an indicator, an indication of at least one reconfigured functionality on the secondary IoT device, wherein the indication comprises at least one of an association of at least one functionality of the primary IoT device with the secondary IoT device, a change in an operation capability of the primary IoT device on the secondary IoT device due to a change in a hardware state of the secondary IoT device, or switching back the at least one reconfigured functionality to the at least one default functionality of the secondary IoT device.

The at least one processor is further configured to switch back at least one reconfigured functionality into the at least one default functionality of the secondary IoT device.

We claim:

1. A method for controlling a remote device in an Internet of Things (IoT) environment, the method comprising:
    identifying a primary IoT device in a first location;
    identifying at least one secondary IoT device in a second location;
    determining that a user is currently in the second location;
    determining an intent of the user to control the primary IoT device from the second location; and
    reconfiguring at least one default functionality of at least one hardware control of a secondary IoT device, among the at least one secondary IoT device, such that the secondary IoT device is operable by the user as a user interface to control the primary IoT device from the second location.

2. The method as claimed in the claim 1, further comprising:
    determining at least one functionality of the primary IoT device based on the determined intent of the user; and
    selecting the secondary IoT device, among the at least one secondary IoT device at the second location, based on a capability of the selected secondary IoT device to emulate the at least one functionality of the at least one hardware control of the primary IoT device,
    wherein the reconfiguring comprises reconfiguring the at least one default functionality of the at least one hardware control of the selected secondary IoT device to emulate the at least one functionality of the at least one hardware control of the primary IoT device.

3. The method as claimed in the claim 1, wherein the reconfiguring comprises:
    configuring the at least one default functionality of the at least one hardware control of the secondary IoT device into at least one new functionality that emulates at least one functionality of the at least one hardware control of the primary IoT device.

4. The method as claimed in claim 1, further comprising:
    mapping at least one hardware control of the secondary IoT device with at least one functionality of the at least one hardware control of the primary IoT device.

5. The method as claimed in claim 3, wherein the configuring the at least one default functionality of the at least one hardware control of the secondary IoT device into the at least one new functionality comprises:
    selecting at least one unused hardware control, from at least one hardware control of the secondary IoT device, based on a capability of the secondary IoT device to emulate the at least one functionality of the at least one hardware control of the primary IoT device, the at least one unused hardware control being hardware control of the secondary IoT device having a default functionality that is not currently being used for the default functionality, the default functionality corresponding to control of at least one function of the secondary IoT device;
disassociating a default functionality of the selected at least one unused hardware control of the secondary IoT device; and
configuring the default functionality of the selected at least one unused hardware control of the secondary IoT device with to emulate the at least one functionality of the primary IoT device.

6. The method as claimed in the claim 1, wherein the determining the intent of the user comprises:
determining the intent of the user to control the primary IoT device at the first location based on a user command received via at least one of a voice command, a user input via a graphical user interface (GUI), or hardware.

7. The method as claimed in the claim 1, wherein the determining the intent of the user comprises:
determining the intent of the user to control the primary IoT device at the first location based on analyzing at least one parameter associated with at least one of a past behavior of the user, a number of active devices in the IoT environment, a current location of the user, a number of unused IoT devices near the user, or a number of IoT devices recently operated by the user.

8. The method as claimed in the claim 7, further comprising:
determining the at least one functionality of the at least one hardware control of the primary IoT device that is frequently utilized by the user based on the at least one parameter,
wherein the reconfiguring comprises reconfiguring the at least one default functionality of the at least one hardware control of the secondary IoT device to emulate the determined at least one functionality of the at least one hardware control of the primary IoT device.

9. The method as claimed in the claim 2, wherein the determining the at least one functionality of the at least one hardware control of the primary IoT device comprises:
detecting a change in a state of at least one IoT devices in the IoT environment, and determining the at least one functionality of the at least one hardware control of the primary IoT device based on the detected change.

10. The method as claimed in claim 4, further comprising:
identifying the secondary IoT device based on a hardware control of the secondary IoT device, of which a current state is convertible into a new state of a capability of the primary IoT device; and
mapping the hardware control of the identified secondary IoT device with the new state of the capability of the primary IoT device.

11. The method as claimed in claim 1, further comprising:
providing, via an indicator, an indication of at least one reconfigured functionality of the at least one hardware control on the secondary IoT device,
wherein the indication comprises at least one of an association of at least one functionality of the at least one hardware control of the primary IoT device with the secondary IoT device, a change in an operation capability of the primary IoT device on the secondary IoT device due to a change in a hardware state of the secondary IoT device, or switching back the at least one reconfigured functionality to the at least one default functionality of the at least one hardware control of the secondary IoT device.

12. The method as claimed in the claim 1, further comprising:
switching back at least one reconfigured functionality into the at least one default functionality of the at least one hardware control of the secondary IoT device.

13. An apparatus for controlling a remote device in an Internet of Things (IoT) environment, the apparatus comprising
at least one memory storing computer-readable instructions; and
at least one processor configured to execute the computer-readable instructions to:
identify a primary IoT device in a first location;
identify at least one secondary IoT device in a second location;
determine that a user is currently in the second location;
determine an intent of the user to control the first IoT device from the second location; and
reconfigure at least one functionality of at least one hardware control of a second IoT device, among the at least one secondary IoT device, such that the second IoT device is operable by the user as a user interface to control the first IoT device from the second location.

14. The apparatus as claimed in the claim 13, wherein the at least one processor is further configured to:
determine at least one functionality of the at least one hardware control of the primary IoT device based on the determined intent of the user;
select the secondary IoT device, among the at least one secondary IoT device at the second location, based on a capability of the selected secondary IoT device to emulate the at least one functionality of the at least one hardware control of the primary IoT device; and
reconfigure the at least one default functionality of the at least one hardware control of the selected secondary IoT device to emulate the at least one functionality of the at least one hardware control of the primary IoT device.

15. The apparatus as claimed in the claim 13, wherein the at least one processor is further configured to:
configure the at least one default functionality of the at least one hardware control of the secondary IoT device into at least one new functionality that emulates at least one functionality of the at least one hardware control of the primary IoT device.

16. The apparatus as claimed in claim 13, wherein the at least one processor is further configured to:
map at least one hardware control of the secondary IoT device with at least one functionality of at least one hardware control of the primary IoT device.

17. The apparatus as claimed in claim 15, wherein the at least one processor is further configured to:
select at least one unused hardware control, from at least one hardware control of the secondary IoT device, based on a capability of the secondary IoT device to emulate the at least one functionality of the at least one hardware control of the primary IoT device, the at least one unused hardware control being a hardware control of the secondary IoT device having a default functionality that is not currently being used for the default functionality, the default functionality corresponding to control of at least one function of the secondary IoT device;
disassociate a default functionality of the selected at least one unused hardware control of the secondary IoT device; and configure the default functionality of the selected at least one unused hardware control of the secondary IoT device with to emulate the at least one functionality of at least one hardware control of the primary IoT device.

18. The apparatus as claimed in the claim 13, wherein the at least one processor is further configured to:

determine the intent of the user to control the primary IoT device at the first location based on analyzing at least one parameter associated with at least one of a past behavior of the user, a number of active devices in the IoT environment, a current location of the user, a number of unused IoT devices near the user, or a number of IoT devices recently operated by the user.

19. The apparatus as claimed in the claim 18, wherein the at least one processor is further configured to:

determine the at least one functionality of at least one hardware control of the primary IoT device that is frequently utilized by the user based on the at least one parameter; and reconfigure the at least one default functionality of at least one hardware control of the secondary IoT device to emulate the determined at least one functionality of at least one hardware control of the primary IoT device.

20. The apparatus as claimed in the claim 14, wherein the at least one processor is further configured to:

detect a change in a state of at least one IoT devices in the IoT environment, and determine the at least one functionality of at least one hardware control of the primary IoT device based on the detected change.

\* \* \* \* \*